United States Patent [19]

Ohmachi et al.

[11] Patent Number: 4,973,415

[45] Date of Patent: Nov. 27, 1990

[54] RAPIDLY QUENCHED RIBBON MAGNET AND PLASTIC MAGNET CONTAINING POWDERS OF THE RAPIDLY QUENCHED RIBBON MAGNET

[76] Inventors: Ryoji Ohmachi, 5-4-29, Danjocho, Nishinomiya-shi, Hyogo-ken; Hiroshi Yamamoto, 2-24-5, Asagayakita, Suginami-ku, Tokyo; Mituru Nagakura, 7-3-18, Nagatsuda, Midori-ku, Yokohama-shi, Kanagawa-ken; Takehiko Miyauchi, 2-17-32, Misumicho, Higashimurayama-shi, Tokyo, all of Japan

[21] Appl. No.: 160,305

[22] Filed: Feb. 25, 1988

[51] Int. Cl.$^5$ .............................................. C04B 35/64
[52] U.S. Cl. ............................. 252/62.53; 252/62.54; 148/302; 148/104; 420/83; 420/121
[58] Field of Search ................... 148/302, 104; 420/83, 420/121; 252/62.53, 62.54

[56] References Cited

U.S. PATENT DOCUMENTS 4,558,077 12/1985 Gray .................................. 148/302

FOREIGN PATENT DOCUMENTS 3514516 10/1985 Fed. Rep. of Germany ...... 148/302
60-221549 11/1985 Japan ................................. 148/302

*Primary Examiner*—John P. Sheehan
*Attorney, Agent, or Firm*—Majestic, Parsons, Siebert & Hsue

[57] ABSTRACT

A rapidly quenched ribbon magnet has a composition represented by the formula of $R_xFe_yB_z$. In the furmula, R represents a rare earth element mixture consisting essentially of 1 to 39 wt. % of praseodymium, 60 to 98 wt. % of neodymium and 1 to 10 wt. % of cerium. Fe represents iron. B represents boron. x is 33 to 35 wt. %. y is 60 to 66 wt. %. z is 0.8 to 1.2 wt. %. The plastic magnet contains a thermosetting resin and powders of the rapidly quenched ribbon magnet.

6 Claims, No Drawings

RAPIDLY QUENCHED RIBBON MAGNET AND PLASTIC MAGNET CONTAINING POWDERS OF THE RAPIDLY QUENCHED RIBBON MAGNET

BACKGROUND OF THE INVENTION:

This invention relates to a rapidly quenched ribbon magnet and a plastic magnet containing powders of the rapidly quenched ribbon magnet.

Among the rare earth element-iron-boron base alloys for permanent magnets, there is known a sintered magnet of a neodymium-iron-boron base alloy. This alloy material has drawn public attention because the materials for the alloy are available more easily than the samarium-cobalt base alloy for permanent magnets while being rather inexpensive and of higher performance characteristics. Also known are a sintered magnet of an iron-boron base alloy containing a rare earth element derived from didymium, and a ribbon magnet of a neodymium-iron-boron base alloy.

There is also known a plastic magnet containing magnet powders obtained by pulverizing a rapidly quenched ribbon magnet of a neodymium-iron-boron base alloy or a rapidly quenched ribbon magnet of a praseodymium-iron-boron base alloy.

However, problems are presented in the industrial mass production of the elements neodymium and praseodymium as the starting materials for the rapidly quenched ribbon magnet of the neodymium-iron-boron base alloy or the praseodymium-iron-boron base alloy because the complicated and expensive production process is involved in the preparation of these elements, while it has not been possible to produce these elements with fully satisfactory magnetic properties. In addition, in the case of these known rapidly quenched ribbon magnets, a heating process has been required to perform after the manufacture of the ribbon magnets in order to evolve their magnetic properties, with correspondingly increased production costs.

SUMMARY OF THE INVENTION

It is a principal object of the present invention to provide a rapidly quenched ribbon magnet and a plastic magnet containing powders of the rapidly quenched ribbon magnet which has higher magnetic properties and can be produced industrially in larger quantities at low costs and for which the heating process for evolving the magnetic properties is not required after the manufacture thereof.

It is another object of the present invention to produce a rapidly quenched ribbon magnet and a plastic magnet containing powders of the rapidly quenched ribbon magnet that are excellent in oxidation-proofing properties.

It is a further object of the present invention to provide a plastic magnet having higher magnetic properties and that can be easily molded to various shapes.

These and other objects of the present invention will become more apparent from the following description of the invention.

According to the present invention, there is provided a rapidly quenched ribbon magnet having a composition represented by the formula of:

$$R_xFe_yB_z$$

wherein R represents a rare earth element mixture consisting essentially of 1 to 39 wt. % of praseodymium, 60 to 98 wt. % of neodymium and 1 to 10 wt. % of cerium, Fe represents iron and B represents boron, x being 33 to 35 wt. %, y being 60 to 66 wt. % and z being 0.8 to 1.2 wt. %.

According to the present invention, there is also provided a plastic magnet containing powders of the rapidly quenched ribbon magnet having the above defined composition and a thermosetting resin.

PREFERRED EMBODIMENTS OF THE INVENTION

The present invention will now be explained in detail.

According to the present invention, rare earth elements used as the material for the rapidly quenched ribbon magnet are used in the form of a rare earth element mixture consisting essentially of 1 to 39 wt. % of praseodymium (Pr), 1 to 10 wt. % of cerium (Ce) and 60 to 98 wt. % of neodymium (Nd). The term "consisting essentially of" means that industrially unavoidable impurities may be occasionally included in the material.

According to the present invention, the rare earth element mixture may be produced by molten oxide electrolysis using a mixture of 75 to 85 wt. % of neodymium oxide, 10 to 20 wt. % of praseodymium oxide and 1 to 15 wt. % of cerium oxide obtained as a by-product after separation of light rare earth elements such as cerium (Ce) and lanthanum (La) and heavy rare earth elements such as samarium (Sm), europium (Eu), gadolinium (Gd) and yttrium (Y) from the natural rare earth element resources for respective usages and applications, namely the didymium compound, as the starting material. Therefore, the rare earth element mixture is markedly less expensive than the conventional neodymium-iron-boron base alloy material for permanent magnets containing neodymium as the sole rare earth element, and can be produced on an industrial scale. It is to be noted that an alloy obtained by melting separately prepared neodymium, praseodymium and cerium in a melting furnace may also be employed as the alloy mixture for preparation of the magnet of the present invention.

In the rapidly quenched ribbon magnet of the present invention, it is an outstanding feature that the element neodymium may not be used by itself as the rare earth element but a ternary rare earth element mixture may be used in which praseodymium and cerium are added thereto so that praseodymium and cerium account for 1 to 39 wt. % and 1 to 10 wt. % of the total composition, respectively. The cerium-iron-boron base alloy has a saturation magnetization (Is) of 1.16 teslas and an anisotropic field (Ha) of 3.7 MA/m, whereas the neodymium-iron-boron base alloy has a saturation magnetization (Is) of 1.57 teslas and an anisotropic field (Ha) of 12 MA/m. In view of these significant differences in magnetic properties, it has been estimated that the saturation magnetization and the coercive force are lowered by the inclusion of cerium in a permanent magnet material so that it is not possible to produce permanent magnets of higher magnetic characteristics. Based on this estimation, it was a common practice to remove cerium to prepare a permanent magnet material containing as little cerium as possible. However, it has been surprisingly found that, by using the specified amount of cerium as defined in the present specification and the appended claims in conjunction with the specified amount of praseodymium, there may be produced a permanent magnet having a larger coercive force and hence a larger maximum energy product than those obtained when using the element neodymium alone in the starting material.

With the contents of cerium less than 1 wt. % and the contents of praseodymium less than 1 wt. %, it becomes difficult to produce a ribbon shape. With the contents of cerium and praseodymium in excess of 10 and 39 wt. %, respectively, the saturation magnetization (Is) is lowered so that the resulting magnet cannot be used practically.

In accordance with the present invention, pure boron or ferroboron may be used as boron and may contain ilicon, aluminum and carbon as impurities, while electrolytic iron, pure iron or low carbon soft iron may be used as iron.

In accordance with the present invention, the composition containing 33 to 35 wt. % of the aforementioned rare earth element mixture, 60 to 66 wt. % of iron and 0.8 to 1.2 wt. % of boron is employed. With the contents of the rare earth element mixture less than 33 wt. %, the coercive force is lowered. With the contents of the rare earth element mixture in excess of 35 wt. %, the amount of the ferromagnetic phase is decreased, while the saturation magnetization (Is) is lowered. With the contents of boron less than 0.8 wt. %, a stable ferromagnetic phase is not obtained. On the other hand, the saturation magnetization (Is) is lowered with increase in the contents of boron, while higher performance characteristics are not obtained with the boron contents higher than 1.2 wt. %.

In the preparation of the rapidly quenched ribbon magnet accroding to the present invention, the starting metal material is melted at about 1500° C. and molded to produce an alloy ingot. This alloy ingot containing the rare earth elements is then melted at a temperature of about 1550° to 1560° C. in an atmosphere of an inert gas, such as high quality argon or helium. The resulting melted product is injected on a single-roller and rapidly quenched at a substrate surface velocity of 7.9 to 19.6 m/sec and preferably 7.9 to 15.7 m/sec to produce the rapidly quenched ribbon magnet.

In the preparation of the plastic magnet, the rapidly quenched ribbon magnet is crushed and pulverized to powders. The particle size of the powders of the rapidly quenched ribbon magnet is preferably 62 to 149 microns and more preferably 70 to 120 microns. With the particle size in excess of 149 microns, the magnetic properties are undesirably lowered. On the other hand, with the particle size less than 62 microns, the magnet is undesirably liable to oxidation.

As the thermosetting resin employed in the plastic magnet of the present invention, heat-resistant resins, such as epoxy or silicon resins, and, above all, epoxy and silicon resins curing at ambient temperature, are preferred. These thermosetting resins may be produced by any means known in the art.

In accordance with the present invention, the desirable mixing ratio of the rapidly quenched ribbon magnet and the thermosetting resin is 6 to 12 wt. % of the thermosetting resin and the balance of the rapidly quenched ribbon magnet, based on the total weight of the mixture. With the contents of the thermosetting resin in excess of 12 wt. %, the magnetic properties are deteriorated.

In accordance with the present invention, the magnet may be molded to any desired shape using any of the known molding methods, such as injection or compression molding methods.

The rapidly quenched ribbon magnet of the present invention has a higher coercive force and an excellent corrosion resistance. The ribbon magnet of the present invention may be produced extremely easily and at reduced costs because the heating process is not required. Therefore, the rapidly quenched ribbon magnet of the present invention is highly useful as industrial products and may be used advantageously, for example as the material for sensors.

EXAMPLES OF THE INVENTION

The present invention will be explained with reference to certain Examples and Comparative Examples.

EXAMPLE 1

500 g of a rare earth element alloy containing 80 wt. % of Nd, 15 wt. % of Pr and 5 wt. % of Ce was prepared through molten oxide electrolysis using a didymium compound as the starting material for the alloy. The alloy thus produced was charged into an alumina crucible together with 955.3 g of electrolytic iron as iron (Fe) and 14.7 g of boron (B). The alloy was melted at 1550° C. in an argon atmosphere in a high frequency furnace of 10 KVA to produce an alloy ingot. The ingot was mainly composed of 34 wt. % of the rare earth element mixture, 65 wt. % of iron (Fe) and 1 wt. % of boron (B). The alloy ingot was then melted at 1550° C. in a high frequency furnace and rapidly quenched in a high purity argon gas atmosphere by the single-roller melt-spinning method of liquid quenching using a substrate surface velocity of 3.9, 7.9, 11.8, 15.8, 19.6, 23.6 and 31.4 m/sec to produce rapidly quenched ribbon magnets.

After pulsed magnetization, the magnetic properties of the produced ribbon magnets were measured using a vibrating sample magnetometer (V.S.M.) manufactured by TOEI KOGYO Co. Ltd., while the magnets were in the ribbon state. The results are shown in the following Table 1.

TABLE 1

| Substrate Surface Velocity (m/sec) | Maximum Energy Product (BH) max (KJ/m$^3$) | Coercive Force H$_{CB}$ (KA/m) | Remanence $\sigma_T$ (Wb · m/Kg × 10$^{-5}$) |
|---|---|---|---|
| 3.9 | 28.0 | 248 | 6.25 |
| 7.9 | 81.6 | 456 | 8.25 |
| 11.8 | 98.3 | 535 | 10.1 |
| 15.8 | 87.2 | 480 | 9.25 |
| 19.6 | 62.4 | 360 | 8.76 |
| 23.6 | 28.8 | 240 | 7.25 |
| 31.4 | — | — | 3.75 |

EXAMPLE 2

An alloy ingot having the same composition as in Example 1 was produced by the method similar to that used in Example 1, except using metal neodymium (purity, 99.9%), metal praseodymium (purity, 99%) and metal cerium (purity, 99.9%) manufactured by Reearch Chemical Inc., USA. Using this alloy ingot, a rapidly quenched ribbon magnet of the present invention was produced with a substrate surface velocity of 11.8 m/sec, and the magnetic properties thereof were measured. The results are shown in Table 2.

COMPARATIVE EXAMPLE 1

A rapidly quenched ribbon magnet was produced by the similar method as in Example 2 except that metal cerium was not used, and the magnetic properties thereof were measured. The results are shown in Table 2.

TABLE 2

| | Maximum Energy Product (BH)max ($KJ/m^3$) | Coercive Force $H_{CB}$ (KA/m) | Remanence σr Wb·m/Kg × $10^{-5}$) |
|---|---|---|---|
| Example 2 | 96.8 | 524 | 10.0 |
| Com. Ex. 1 | 80.0 | 430 | 8.8 |

EXAMPLE 3

The ribbon magnet produced in accordance with Example 1 using the substrate surface velocity of 11.8 m/sec was crushed and pulverized in a ball mill to powders having a particle size of 80 microns. 90 wt. % of the powders of the rapidly quenched ribbon magnet thus produced was mixed with 10 wt. % of an epoxy resin curing at ambient temperature, and the resulting mixture was processed into a plastic magnet using a compression molding method. The magnetic properties of the produced plastic magnet after pulsed magnetization thereof were measured using a high sensitivity recording fluxmeter manufactured by TOEI KOGYO Co. Ltd. Thus, the maximum energy product and the specific gravity thereof were found to be 65.3 $KJ/m^3$ and 5.96 $Mg/m^3$, respectively, while the reversible temperature coefficient (α Br) at +21° to 100° C. was found to be −0.114%/°C.

EXAMPLE 4

The rapidly quenched ribbon magnet obtained in accordance with Example 2 was crushed and pulverized to powders and 90 wt. % of the rapidly quenched ribbon magnet powders and 10 wt. % of a silcon resin were mixed and molded by the method shown in Example 3 to produce a plastic magnet.

The magnetic properties, specific gravity and the reversible temperature coefficient (αBr) of the plastic magnet thus produced were measured by the method similar to that shown in Example 3. The maximum energy product and the specific gravity were found to be equal to 65.0 $KJ/m^3$ and 5.90 $Mg/m^3$, respectively, while the reversible temperature coefficient (αBr) at 21° to 100° C. was found to be −0.114%/°C.

COMPARATIVE EXAMPLE 2

A plastic magnet was produced similarly to Example 3 except that sintered alloy powders for permanent magnets having a composition of 34 wt. % of a rare earth element mixture containing 95 wt. % of Nd and 5 wt. % of Pr, 65 wt. % of iron (Fe) and 1 wt. % of boron (B) were used, and the magnetic properties as well as the specific gravity and the reversible temperature coefficient (αBr) were measured. The maximum energy product and the specific gravity were found to be equal to 58.8 $KJ/m^3$ and 5.90 $Mg/m^3$, respectively, while the reversible temperature coefficient (αBr) at 21° to 100° C. was found to be equal −0.17%/°C.

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A plastic magnet comprising a thermosetting resin as a binder and powders of a rapidly quenched ribbon magnet compact with the resin and having a composition represented by the formula of:

$$R_xFe_yB_z$$

wherein R represents a rare earth element mixture consisting essentially of 1 to 39 wt. % of praseodymium, 60 to 98 wt. % of neodymium and 1 to 10 wt. % of cerium, Fe represents iron and B represents boron, x being 33 to 35 wt. %, y being 60 to 66 wt. % and x being 0.8 to 1.2 wt. %.

2. A plastic magnet according to claim 1 wherein said plastic magnet contains 6 to 12 wt. % of said thermosetting resin and 94 to 88 wt. % of said rapidly quenched ribbon magnet.

3. A plastic magnet according to claim 1 wherein the powders of said rapidly quenched ribbon magnet have a particle size of 62 to 194 microns.

4. A plastic magnet according to claim 1 wherein said thermosetting resin is selected from the group consisting of epoxy resin and silicon resin.

5. A plastic magnet according to claim 1 wherein said rare earth element mixture is obtained from a didymium compound as the starting material.

6. A plastic magnet according to claim 1, wherein a melted product having said composition is injected on a roll and rapidly quenched at a substrate surface velocity of 7.9 to 19.6 m/sec.

* * * * *

UNITED STATES PATENT AND TRADEMARK OFFICE
CERTIFICATE OF CORRECTION

PATENT NO. : 4,973,415

DATED : November 27, 1990

INVENTOR(S) : Ryoji Ohmachi et al

It is certified that error appears in the above-identified patent and that said Letters Patent is hereby corrected as shown below:

On the title page please insert --[73] Assignee: Santoku Metal Industry Co., Ltd., Hyogo, Japan--.

Signed and Sealed this

Twenty-first Day of July, 1992

Attest:

DOUGLAS B. COMER

*Attesting Officer*      *Acting Commissioner of Patents and Trademarks*